3,223,742
ALKYLATION OF ALKYL AROMATIC HYDROCARBONS

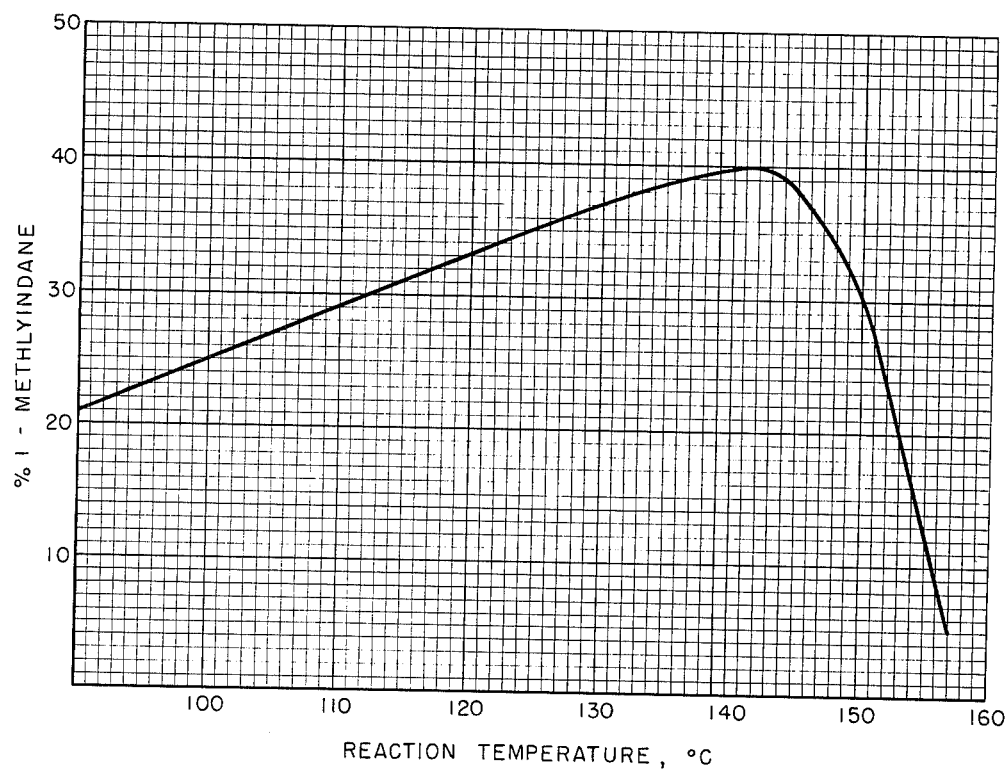
EFFECT OF REACTION TEMPERATURE
ON RING CLOSURE REACTION
INVENTOR.
GERT G. EBERHARDT
ATTORNEY

Gert G. Eberhardt, Philadelphia, Pa., assignor to Sun Oil Company, Philadelphia, Pa., a corporation of New Jersey
Filed Jan. 26, 1965, Ser. No. 428,065
20 Claims. (Cl. 260—668)

This application is a continuation-in-part of my copending application Serial No. 169,678, filed January 29, 1962, and now abandoned.

This invention relates to the alkylation of substituted aromatic hydrocarbons with olefins in a manner whereby alkylation occurs at the alpha carbon atom of the substituent group. The invention also embraces a novel catalyst system utilized in achieving such alkylation.

It is known in the prior art that alkali metals when activated by means of certain promoters can catalyze the alkylation of substituted aromatic hydrocarbons in a manner such that alkylation occurs at the alpha carbon atom of the side chain rather than on the aromatic nucleus. Such a procedure wherein potassium promoted by means of anthracene was used as the catalyst has been disclosed by Schaap and Pines, J.A.C.S., vol. 79, pages 4967–4970 (1957). These authors showed that in addition to alkylation ring closure can occur to an extent, resulting in the formation of indanes along with alkylbenzene. Other promoters which have been used with alkali metals to catalyze the side chain alkylation of aromatics are acetylenic hydrocarbons (U.S. Patent No. 2,670,390), heterocyclic nitrogen compounls (U.S. Patent No. 2,688,044), organic peroxy compounds (U.S. Patent No. 2,748,178) and conjugated diolefins (U.S. Patent No. 2,849,508).

In copending application Serial No. 70,440, filed November 21, 1960, by the present applicant, now Patent No. 3,065,282, an improved catalyst system has been described for effecting the foregoing type of reaction. Such catalyst system comprises an alkali metal, e.g., potassium, promoted by a compound of the formula $MAlR_4$ wherein M is an alkali metal. The promoter can be, for example, potassium aluminum tetraethyl. This type of catalyst is considerably more active for effecting the side chain alkylation of aromatics than are the prior art catalysts mentioned above, being capable of promoting the reaction at lower temperature and without the necessity of an initial induction period as required by prior catalysts. Also such catalyst has higher activity for promoting ring closure and hence is capable of producing higher yields of indanes than have been obtained with the prior art catalyst systems.

I have now discovered a catalyst system which has still higher activity for effecting the side chain alkylation of aromatics and for promoting ring closure to yield hydrocarbons having the indane structure. The catalyst is prepared by reacting in a hydrocarbon medium either metallic potassium (K), potassium hydride (KH) or an organopotassium compound having the formula $KR'$ with an organolithium compound of the formula $LiR$ wherein R and R' are non-olefinic hydrocarbon radicals having 1–10 carbon atoms. Formation of the active catalyst species involves reactions that lead to an organo K-Li complex which is $K(LiR_2)$ in the case where metallic potassium is used, $K(LiHR)$ where $KH$ is used and $K(LiRR')$ when $KR'$ is employed. These complexes are in equilibrium with the components from which they are formed and do not appear to be capable of isolation per se. The equilibrium reactions, for example, when metallic potassium is used are believed to be as follows:

(I) 
(II) 

The following is believed to occur when the starting material is potassium hydride:

(III) 

In this case the complex is further converted, when contacted with olefin during the alkylation of the substituted aromatic, as follows:

(IV)   $K(LiHR) + olefin \rightarrow K(LiRR')$

When the starting catalyst component is $KR'$, the following single equilibrium reaction appears to be involved in forming the catalyst system:

(V) 

Thus with either K, KH or KR' as the starting material, active catalyst species which are the same or equivalent are obtained.

According to the invention, the side chain alkylation of substituted aromatics is carried out in a manner whereby considerable formation of cyclization products, e.g., indanes, results by contacting an alpha olefin with the aromatic at a temperature in the range of about 80–160° C., preferably below 150° C. and most preferably at 120–140° C., in the presence of a catalyst system prepared by reacting K, KH or KR' in a hydrocarbon medium with LiR, wherein R and R', which may be the same or different, are hydrocarbon radicals having 1–10 carbon atoms. R and R' can be any non-olefinic hydrocarbon group, such as alkyl, cycloalkyl, aryl or aralkyl, which has from 1 to 10 carbon atoms. An inert hydrocarbon reaction medium, such as octane or benzene, can be used if desired, although this is not essential. The alkylation reaction begins without any induction period as soon as the reactants at the temperature specified are brought into contact with the catalyst system, and the speed of reaction depends upon the temperautre selected within the specified range.

The aromatic to be alkylated should be a benzenoid hydrocarbon and must have at least one saturated hydrocarbon group substituent in which the carbon atom attached to the benzene nucleus is itself attached to at least one hydrogen atom. In other words the aromatic must contain at least one saturated substituent group having benzylic hydrogen. The alkylation effected by the catalyst system occurs at such alpha carbon atom. Any benzenoid hydrocarbon of this kind can be alkylated in the present process. The following are examples of such alkylatable aromatics: toluene, xylenes, ethylbenzene, n-propylbenzene, cumene, the trimethylbenzenes, normal and secondary butylbenzene, tetralin, cyclohexylbenzene and indane.

Any alpha olefin can be used as the alkylating agent and the number of carbon atoms therein can vary, for example, from two to twenty. $C_2$–$C_4$ olefins, especially ethylene and propylene, are the preferred olefins but higher alpha olefins, such as pentene-1,3-methylbutene-1, hexenes, octenes, propylene trimers and tetramers, etc. will function satisfactorily.

Organolithium compounds suitable for preparing the present catalyst correspond, as previously stated, to the formula LiR wherein R is alkyl, cycloalkyl, aryl or aralkyl and contains 1 to 10 carbon atoms. Examples of suitable R groups are: ethyl, propyl, isopropyl, n-butyl, isobutyl, tertiary butyl, n-amyl, isoamyl, n- or isooctyl, n- or isodecyl, cyclopentyl, methylcyclohexyl, phenyl, benzyl, tolyl, xylyl, cumyl, methylbenzyl, propylbenzyl, 2-phenylethyl, 2(3-ethyl)phenylethyl and the like.

The catalyst system for practicing the present process is preferably pre-formed by reacting K, KH or KR' with LiR in the benzenoid hydrocarbon to be used as reactant and in the absence of the olefin reactant. The reaction between these catalyst-forming components can be effected at room temperature but the reaction is slow and time consuming; hence it is preferable to use an elevated temperature such as 50–150° C. The two-components react in the manner indicated by Equations I and II, III or V supra to form compounds as shown which are in equilibrium with the catalyst-forming reactants. However, the resulting equilibrium product further reacts with the benzylic hydrocarbon when R or R' is alkyl and results in the substitution of a benzenoid group for the alkyl group. For example, assuming potassium hydride and lithium butyl are used as per Equation III and the benzylic hydrocarbon is ethylbenzene, a further reaction will result according to the following equation:

(VI)

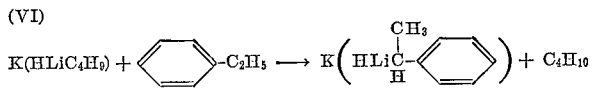

From this equation it can be seen that a benzylic hydrogen atom transfers from the ethylbenzene to the butylene group thus releasing butane and the ethylbenzene moiety becomes a part of the catalyst. This pre-formed catalyst can then be used to effect reaction between the alpha olefin and the benzylic hydrocarbon reactant to alkylate the latter and produce indanes in substantial yield.

The catalyst system can also be pre-formed by adding LiR and the potassium-containing component to an inert hydrocarbon medium and allowing these components to react as per the foregoing equations, preferably at a temperature of 50–150° C. As the inert hydrocarbon medium saturated hydrocarbons, such as hexane, octane or decane, or benzenoid hydrocarbons which do not contain benzylic hydrogen, such as benzene or t-butylbenzene, can be employed. After the components have been reacted for sufficient time to reach equilibrium, e.g., for 1 to 3 hours, the mixture can then be added to the benzylic hydrocarbon reactant. This will result in the substitution of a benzylic hydrocarbon moiety in the catalyst, as indicated by Equation VI, when R and R' are alkyl or cycloalkyl.

The catalyst can also be prepared by adding the LiR and potassium-containing components to the benzylic hydrogen-containing benzenoid hydrocarbon and immediately adding the alpha olefin reactant. However, this procedure is not preferred and it is distinctly desirable to preform the catalyst as above described to avoid undesired reactions such as, for example, a reaction in which KH itself functions as the catalyst before the desired catalyst species has had the opportunity to form.

After the catalyst has been pre-formed, the alpha olefin reactant is added and reaction thereof with the benzenoid hydrocarbon is effected at about 80–160° C., more preferably below 150° C. and most preferably at 120–140° C., by agitating the mixture. The system will be heterogeneous, as the catalyst is insoluble in the hydrocarbons. One factor upon which the rate of reaction depends is the molecular weight of the olefin used, with ethylene being the most reactive. It also depends upon various other factors, some of which are reaction temperature, degree of agitation and concentration of the olefin reactant. Hence the reaction time can vary widely, e.g., from one-half to 50 hours. As a specific illustration of rate, the reaction of ethylbenzene and ethylene at 135° C. and an ethylene pressure of 800 p.s.i., using catalyst prepared from KH and $LiC_4H_9$ in a 1:2 molar ratio, typically can be effected at a rate of one mole of ethylene per gram of catalyst per hour.

Both the preparation of catalyst and the alkylation reaction should be carried out under conditions whereby oxygen (air) and water are excluded from the system, as these contaminants will react with the catalyst and destroy it if they are present in sufficient amounts.

The activity of the present catalyst system, with respect both to the rate of reaction and its propensity for effecting ring closure, depends upon the atomic ratio of K to Li in the system. Generally this ratio should be in the range of 1:10 to 5:1. LiR alone (corresponding to a K:Li ratio of zero) has no activity under the conditions used in the present process. As the K:Li ratio increases the activity with respect to reaction rate increases rapidly, passes through a maximum and then decreases continuously toward the low activity found with potassium alone. On the other hand, as the K:Li ratio decreases there is a continuous increase in the propensity of the catalyst to effect ring closure, or in other words, the percent conversion to indanes continuously increases. When it is desired to maximize formation of indanes, operation at K:Li atomic ratios in the range of 1:1 to 1:3 gives best results considering rate of reaction and degree of conversion to indanes.

The rate of reaction also depends upon the amount of catalyst present in the reaction system, with the rate increasing as catalyst concentration increases. However, the reaction can, in a system free of traces of oxygen and water, be effected with only a trace of catalyst although a long reaction time will be required. Since it is practically impossible to exclude these contaminants from the system entirely, and in order to obtain a satisfactory reaction rate, it is desirable to have a substantial amount of catalyst present in the reaction mixture. Generally the amount used is in the range of 0.01–5.0% by weight based on the hydrocarbon reactants.

The degree of formation of indanes by ring closure is also affected by the reaction temperature. This is shown in the accompanying drawing which is based upon runs made at various temperatures for reacting ethylene and ethylbenzene. The runs were made in a rocking-type autoclave using catalyst formed therein in situ in the presence of both hydrocarbon reactants. The drawing shows the content of 1-methylindane in the $C_{10}$ fraction of the product as a function of reaction temperature, the rest of the fraction being alkylation product which did not undergo ring closure. As shown in the drawing the 1-methylindane increased from about 25% at 100° C. to about 40% at 145° C. and then the 1-methylindane content dropped sharply when the reaction temperature exceeded 150° C. In addition to the $C_{10}$ fraction these runs also produced higher alkylation products and the content of ring-closure products (indanes) increased as molecular weight increased. This effect is illustrated in Tables I–IV infra.

Table I also shows that the amount of ring-closure products also depends on the particular hydrocarbon reactants employed.

TABLE I
Reaction of various aromatics and olefins

KH:LiC$_4$H$_9$ molar ratio = 1:2
Temperature = 135° C.
Molar ratio aromatic:olefin = 1:1

| Reactants | | Reaction Products | | |
|---|---|---|---|---|
| Aromatic | Olefin | Fraction | Percent of Product | Composition, percent |
| Toluene | Ethylene | C$_9$ | 70 | 15 indane. 84 propylbenzene. |
|  |  | C$_{11}$ | 20 | 70 1-ethylindane. 30 3-phenylpentane. |
| Ethylbenzene | Ethylene | C$_{10}$ | 72 | 41 1-methylindane. 59 sec-butylbenzene. |
|  |  | C$_{12}$ | 15 | 90 alkylindane. 10 alkylbenzene. |
| Ethylbenzene | Propylene | C$_{11}$ | 80 | 50 dimethylindane. |
|  |  | C$_{13}$+ | 20 | 50 1-phenyl-1,2-dimethylpropane. |
| Cumene | Ethylene | C$_{11}$ | 65 | 62 1,1-dimethylindane. |
|  |  | C$_{13}$+ | 35 | 38 t-amylbenzene. |
| Tetralin | Ethylene | C$_{12}$ | 70 | 40 tetrahydroacenaphthene. |
|  |  | C$_{14}$+ | 30 | 60 1-ethyltetralin. |

From the tabulated data it is apparent that the extent to which the ring closure reaction can occur can depend upon the particular hydrocarbon reactants employed and that in a given reaction the proportion of indanes increases with the molecular weight of the alkylation product.

The conditions set forth above for practicing the present process apply regardless of whether the catalyst is made from potassium, potassium hydride or KR'. Use of KH is advantageous as compared to the use of K in that metallic lithium is left in the system when K is used whereas none is when the component is KH, as can be seen by comparing Equations I and III supra. The use of KR' in preparing the catalysts is not usually desirable, as such organopotassium compounds are not readily available and their preparation by presently known methods is difficult.

In a specific embodiment of the invention a methylbenzene, e.g., toluene, and an olefin having 2-4 carbon atoms, e.g., ethylene, are reacted to produce indanes, such as ethylindane, diethylindane and triethylindane, in substantial yields. This embodiment is illustrated in Example 1 and other specific embodiments are given in Examples 2-5.

EXAMPLE 1

The reactor used was a 300 ml. rocking-type autoclave containing a batch of steel balls to provide better agitation. The reactor was flushed with an inert gas and then one gram mole (106 ml.) of toluene, 1 g. of potassium and 1.7 g. of n-butyl lithium were added to it. The atomic ratio of K:Li was 1:1. Ethylene was pressured into the autoclave to a pressure of 300 p.s.i.g. and the autoclave was heated to 130–150° C. while shaking. The temperature was maintained at that level for a time approaching one hour. Although at the end of this time the reaction was not complete and the catalyst activity was not exhausted, nevertheless the reaction was stopped since the degree of conversion was sufficient to determine the types of reactions involved. The reactor was then cooled down and residual gas was vented. Alcohol was added to destroy the catalyst and the mixture was washed with water several times to remove the alcohol and catalyst residue. The reaction product was then fractionally distilled and several cuts were taken and analyzed. Compositions for the cuts were determined by mass spectroscopy. Results are shown in Table I, in which "percent fraction" is based on total reaction product boiling above the charge atomatic (toluene).

TABLE II

|  | C$_9$ Fraction | C$_{11}$ Fraction | C$_{13}$ Fraction |
|---|---|---|---|
| Cut points, ° C | 140–180 | 180–216 | 216+ |
| Percent Fraction | 63 | 25 | 12 |
| Refractive index, n/20° | 1.4989 | 1.5075 | 1.5090 |
| Mole percent alkylbenzenes | 86 | 40 | 5 |
| Mole percent indanes | [1] 14 | [2] 60 | [3] 95 |

[1] Indane.  [2] Ethylindanes.  [3] Diethylindanes.

These data show that a considerable amount of indanes is formed by the reaction and in fact that the majority of the product boiling above C$_9$ constitutes hydrocarbons of the indane structure. These results show that the present catalyst system has strong proclivity for effecting ring closure when the atomic amounts of K and Li in the catalyst are approximately equal.

EXAMPLE 2

Another run was made in the same manner as for Example 1 except that ethylbenzene was substituted for toluene. Results are shown in Table III.

TABLE III

|  | C$_{10}$ Fraction | C$_{12}$ Fraction |
|---|---|---|
| Cut points, ° C | 155–195 | 195–230 |
| Percent fraction | 80 | 20 |
| Refractive index, n/20° | 1.5032 | 1.5090 |
| Mole percent alkylbenzenes | 62 | <5 |
| Mole percent indanes | [1] 38 | [2] >95 |

[1] Methylindane.  [2] Methylethylindanes.

Again the catalyst is seen to have high activity for promoting ring closure with the formation of indanes.

EXAMPLE 3

Another run was made as in Example 1 except that isopropylbenzene was substituted for toluene. Table IV shows the results.

TABLE IV

|  | C$_{11}$ Fraction | C$_{13}$ Fraction |
|---|---|---|
| Cut points, ° C | 175–200 | 200+ |
| Percent fraction | 75 | 25 |
| Refractive index, n/20° | 1.5052 | 1.5102 |
| Mole percent alkylbenzenes | 35 | <5 |
| Mole percent indanes | [1] 65 | [2] >95 |

[1] Dimethylindane.  [2] Dimethylethylindane.

EXAMPLE 4

Another run was made in the same way as for Example 1 except that tetrahydronaphthalene was substituted for toluene, and results are given in Table V.

TABLE V

|  | C₁₂ Fraction | C₁₄ Fraction |
|---|---|---|
| Cut points, ° C | 220–250 | 250+ |
| Percent fraction | 75 | 25 |
| Refractive index, n/20° | 1.5410 |  |
| Mole percent tetrahydronaphthalenes | ¹ 50 |  |
| Mole percent ring-closure compounds | ² 50 |  |

¹ Ethyl tetrahydronaphthalene.
² Tetrahydroacenaphthene (B.P.=242–3° C.).

It should be noted that about one-half of the C₁₂ fraction was tetrahydroacenaphthene. This unusual hydrocarbon, which has the formula

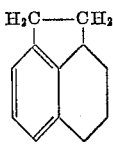

heretofore appears to have been prepared only by partial hydrogenation of acenaphthene. The present example thus demonstrates a novel procedure for making tetrahydroacenaphthene.

EXAMPLE 5

Another run was made using a procedure analogous to that of Example 1; but in this case ethylbenzene was substituted for toluene, the olefin used was propylene and the catalyst was made from a combination of 0.4 g. of KH and 1.3 g. of n-butyl lithium. The amount of propylene used was 0.75 gram mole and the reaction temperature was about 160° C. The results are shown in Table VI.

TABLE VI

|  | C₁₁ Fraction | C₁₄ Fraction |
|---|---|---|
| Cut points, ° C | 155–200 | 200+ |
| Percent fraction | 80 | 20 |
| Refractive index, n/20° | 1.5029 | 1.5250 |
| Mole percent alkylbenzene | ¹ 50 |  |
| Mole percent indanes | ² 50 |  |

¹ 1-phenyl-1,2-dimethylpropane.
² Dimethylindanes.

This example shows that catalysts prepared from potassium hydride and a lithium alkyl are likewise effective for practicing the invention and that olefins other than ethylene can be used as the alkylating agent.

The foregoing examples illustrate the effectiveness of catalyst systems of the present invention for alkylating substituted aromatics by means of olefins and for effecting ring closure of the primary alkylation product. The effectiveness depends upon using the combination of potassium in any of the three forms described with the organolithium compound. In contrast, when sodium is substituted for potassium either as Na, NaH or NaR', the combination obtained with the organolithium compound has little activity for promoting the desired reactions. Also, other organo alkali metal compounds cannot successfully be substituted for LiR.

From the results shown in the examples, it should be apparent that any benzenoid hydrocarbon which has one or more saturated hydrocarbon substituents containing at least one benzylic hydrogen atom can be alkylated by utilizing the novel catalyst system herein described. The invention has particular utility in converting such aromatics into indane type hydrocarbons, and many specific hydrocarbons of this type can be made by the process by appropriate selection of the charge aromatic and olefin. The invention thus provides a means of producing numerous indane type hydrocarbons useful as petrochemicals. These indanes can serve as intermediates for the formation of various other useful compounds. For example, they can be converted to diacids by oxidation, to naphthalene derivatives by isomerization and dehydrogenation, and to indenes, acenaphthenes and the like by dehydrogenation.

I claim:

1. Method which comprises contacting an alpha olefin hydrocarbon with a benzenoid hydrocarbon containing at least one saturated hydrocarbon substituent group having benzylic hydrogen at a temperature in the range of about 80–160° C. in the presence of a catalyst system prepared by reacting in a hydrocarbon medium a member of the group consisting of K, KH and KR' with LiR wherein R and R' are hydrocarbon radicals having 1–10 carbon atoms selected from the group consisting of alkyl, cycloalkyl, aryl and aralkyl and recovering from the reaction mixture an alkylation product including a cyclization product resulting from alkylation by said olefin at a benzylic position of the benzenoid hydrocarbon followed by ring closure of the resulting substituent with the benzenoid nucleus.

2. Method according to claim 1 wherein the catalyst system in prepared by reacting K and LiR in amounts such that the K:Li atomic ratio is in the range of 1:10 to 5:1.

3. Method according to claim 2 wherein said ratio is in the range of 1:1 to 1:3.

4. Method according to claim 1 wherein the catalyst system is prepared by reacting KH and LiR in amounts such that the K:Li atomic ratio is in the range of 1:10 to 5:1.

5. Method according to claim 4 wherein said ratio is in the range of 1:1 to 1:3.

6. Method according to claim 1 wherein said olefin is ethylene.

7. Method according ot claim 1 wherein R and R' are alkyl groups.

8. Method according to claim 1 wherein said temperature is 120–140° C.

9. Method of forming indanes which comprises contacting an olefin having 2–4 carbon atoms with an alkyl benzene having at least one benzylic hydrogen atom at a temperature in the range of 80–150° C. in the presence of a catalyst system prepared by reacting in a hydrocarbon medium a member of the group consisting of K, KH and KR' with LiR wherein R and R' are hydrocarbon radicals having 1–10 carbon atoms selected from the group consisting of alkyl, cycloalkyl, aryl and aralkyl, whereby alkylation at said alkyl group and ring closure occurs to form indanes and recovering from the reaction mixture hydrocarbon product including said indanes.

10. Method according to claim 9 wherein said member is K and said olefin is ethylene.

11. Method according to claim 10 wherein the alkyl group of said alkylbenzene is 1–2 carbon atoms.

12. Method according to claim 9 wherein said member is KH and said olefin is ethylene.

13. Method according to claim 12 wherein the alkyl group of said alkylbenzene has 1–2 carbon atoms.

14. Method according to claim 9 wherein said temperature is 120–140° C.

15. Method of forming tetrahydroacenaphthene which comprises contacting ethylene with tetrahydronaphthalene at a temperature in the range of 80–150° C. in the presence of a catalyst system prepared by reacting in a hydrocarbon medium a member of the group consisting of K, KH and KR' with LiR wherein R and R' are hydrocarbon radicals having 1–10 carbon atoms selected from the group consisting of alkyl, cycloalkyl, aryl and aralkyl and recovering from the reaction mixture hydrocarbon product including tetrahydroacenaphthene.

16. Method which comprises reacting at 50–150° C. in a benzenoid hydrocarbon containing at least one saturated hydrocarbon substituent group having benzylic hydrogen a member of the group consisting of K, KH, and KR' with LiR wherein R and R' are hydrocarbon radicals having 1–10 carbon atoms selected from the group consisting of alkyl, cycloalkyl, aryl and aralkyl, thereby to form a catalyst system, contacting the resulting catalyst system in the presence of said benzenoid hydrocarbon at at temperature in the range of about 80–160° C. with an alpha olefin hydrocarbon, whereby alkylation of said benzenoid hydrocarbon at said substituent group and ring closure of the resulting substituent with the benzenoid nucleus occurs, and recovering from the reaction mixture hydrocarbon product including ring closure product.

17. Method according to claim 16 wherein said member is K.

18. Method according to claim 16 wherein said member is KH.

19. Method according to claim 16 wherein the second-mentioned temperature is in the range of 120–150° C.

20. Method according to claim 16 wherein said olefin is ethylene.

References Cited by the Examiner
UNITED STATES PATENTS

| | | | |
|---|---|---|---|
| 2,548,803 | 4/1951 | Little | 260—668 |
| 2,769,850 | 11/1956 | Closson et al. | 260—668 |
| 2,823,240 | 2/1958 | Field et al. | 260—668 |
| 3,006,976 | 10/1961 | Shaw et al. | 260—671 |

DELBERT E. GANTZ, *Primary Examiner.*

PAUL M. COUGHLAN, *Primary Examiner.*

C. R. DAVIS, *Assistant Examiner.*